(12) United States Patent
Mukai et al.

(10) Patent No.: US 10,075,034 B2
(45) Date of Patent: Sep. 11, 2018

(54) MAGNET-EMBEDDED MOTOR AND COMPRESSOR HAVING MAGNET-EMBEDDED MOTOR

(71) Applicant: SAMSUNG ELECTRONICS CO., LTD., Suwon-si, Gyeonggi-do (KR)

(72) Inventors: Katsuhisa Mukai, Yokohama (JP); Kou Hakuei, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 184 days.

(21) Appl. No.: 15/033,785

(22) PCT Filed: Oct. 31, 2014

(86) PCT No.: PCT/KR2014/010344
§ 371 (c)(1),
(2) Date: May 2, 2016

(87) PCT Pub. No.: WO2015/065088
PCT Pub. Date: May 7, 2015

(65) Prior Publication Data
US 2016/0285330 A1 Sep. 29, 2016

(30) Foreign Application Priority Data

Oct. 31, 2013 (JP) ................................. 2013-226215
Nov. 22, 2013 (JP) ................................. 2013-241546
(Continued)

(51) Int. Cl.
*H02K 1/27* (2006.01)
*F04B 35/04* (2006.01)
(Continued)

(52) U.S. Cl.
CPC ........... *H02K 1/2766* (2013.01); *F04B 35/04* (2013.01); *F04C 18/0215* (2013.01);
(Continued)

(58) Field of Classification Search
CPC .................................................... H02K 1/2766
See application file for complete search history.

(56) References Cited

U.S. PATENT DOCUMENTS 6,147,428 A * 11/2000 Takezawa ............ H02K 1/2766
310/156.57
7,851,958 B2 * 12/2010 Cai ...................... H02K 1/2766
310/156.53
(Continued)

FOREIGN PATENT DOCUMENTS

CN 203219023 U 9/2013
DE 10 2012 222 302 A1 6/2013
(Continued)

OTHER PUBLICATIONS

International Search Report dated Jan. 28, 2015, in corresponding International Patent Application No. PCT/KR2014/010344.
(Continued)

*Primary Examiner* — Dang Le
(74) *Attorney, Agent, or Firm* — Staas & Halsey LLP

(57) ABSTRACT

A motor including: a stator that has a plurality of teeth formed, toward the central axis, on the inner circumferential section of a cylindrical shaped yoke and has a coil wound, with distributed winding, onto the plurality of teeth; and a rotor where a plurality of magnetic poles consisting of two permanent magnets which are rotatably installed on the inside of the stator and placed, in a convex V-shape, on a central axis side of the stator, are formed in the circumferential direction at a uniform interval, wherein the rotor has outer flux barriers consisting of air gaps formed on the
(Continued)

respective diameter directional outer ends of the two permanent magnets, and inner flux barriers consisting of air gaps formed on the respective diameter directional inner ends of the two permanent magnets, the respective inner flux barriers of the two permanent magnets being spatially connected to each other.

19 Claims, 15 Drawing Sheets

(30) Foreign Application Priority Data

Jul. 28, 2014 (JP) .................................. 2014-152743
Oct. 29, 2014 (KR) ........................ 10-2014-0148584

(51) Int. Cl.
*F04C 23/00* (2006.01)
*F04C 29/00* (2006.01)
*F04C 18/02* (2006.01)
*F25B 31/02* (2006.01)

(52) U.S. Cl.
CPC ........ *F04C 23/008* (2013.01); *F04C 29/0057* (2013.01); *F04C 29/0085* (2013.01); *F25B 31/026* (2013.01); *F04C 2240/40* (2013.01); *H02K 2213/03* (2013.01)

(56) References Cited

U.S. PATENT DOCUMENTS

| | | | |
|---|---|---|---|
| 8,598,763 B2* | 12/2013 | Aota .................... | H02K 1/2766 310/156.53 |
| 9,024,499 B2* | 5/2015 | Nakada ................ | H02K 1/2706 310/156.54 |
| 2003/0218399 A1* | 11/2003 | Iles-Klumpner ....... | H02K 1/276 310/156.53 |
| 2004/0080228 A1 | 4/2004 | Ahn et al. | |
| 2012/0293033 A1* | 11/2012 | Hisada ................ | H02K 1/2766 310/156.43 |

FOREIGN PATENT DOCUMENTS

| | | |
|---|---|---|
| EP | 1 914 863 A2 | 4/2008 |
| JP | 3351237 | 9/2002 |
| JP | 2005-86955 | 3/2005 |
| JP | 2007-159196 | 6/2007 |
| JP | 2010-45932 | 2/2010 |
| KR | 10-2010-0005896 | 1/2010 |
| KR | 10-2013-0067218 | 6/2013 |

OTHER PUBLICATIONS

Extended European Search Report dated Apr. 10, 2017, in corresponding European Patent Application No. 14857232.4.
International Search Report dated Jan. 28, 2015, in corresponding International Application No. PCT/KR2014/010344.
European Office Action dated Sep. 29, 2017, in corresponding European Patent Application No. 14 857 232.4.

* cited by examiner k=1.91 k=1.7 k=1.45

MAGNET-EMBEDDED MOTOR AND COMPRESSOR HAVING MAGNET-EMBEDDED MOTOR

CROSS-REFERENCE TO RELATED APPLICATIONS

This application is a U.S. National Stage Application, which claims the benefit under 35 U.S.C. § 371 of PCT International Patent Application No. PCT/KR2014/010344, filed Oct. 31, 2014, which claims the foreign priority benefit under 35 U.S.C. § 119 of Japanese Patent Application No. 2013-226215, filed Oct. 31, 2013, Japanese Patent Application No. 2013-241546, filed Nov. 22, 2013, Japanese Patent Application No. 2014-152743, filed Jul. 28, 2014, and Korean Patent Application No. 10-2014-0148584, filed Oct. 29, 2014, the contents of which are incorporated herein by reference.

TECHNICAL FIELD

The present invention relates to a magnet-embedded motor and a compressor having the magnet-embedded motor.

BACKGROUND ART

Conventionally, a magnet-embedded motor (hereinafter, IPM motor) using reluctance torque other than magnetic torque has been used as a high efficiency motor. The reluctance torque is a force generated using saliency of d-axis inductance (Ld) and q-axis inductance (Lq), and permanent magnets have been often arranged in a V-shape so that Ld and Lq have the saliency. However, since arranging the permanent magnets in a V-shape is not sufficient to ensure a uniform magnetic flux flowing between a magnet and a stator, the consequent increase in cogging torque has led to increase in torque ripples and vibrations during motor operation.

Thus, to reduce the cogging torque, a shape of rotor may be changed as shown in Japanese Patent Application Laid-Open No. 2013-99193, shapes of teeth of a stator may be changed as shown in Japanese Patent Application Laid-Open No. 2011-234601, or a slit may be formed in the rotor as shown in Japanese Patent Application Laid-Open No. 2011-101595.

There have been many cases in which cogging torque has been reduced by optimizing a distance between ordinary magnetic poles, a distance between magnets forming each magnetic pole, angles of the magnets, and lengths of the magnets in the arrangement of magnets embedded in the rotor. In this case, the most efficient way is to change a distance between the magnetic poles. This is because the cogging torque is an attractive force generated between the magnet and the stator, and thus it is necessary that the magnetic flux flowing in the teeth be uniform as much as possible.

For example, when the distance between the magnetic poles is too long, the magnetic flux flowing in the teeth is not uniform, and thus the cogging torque is increased. On the other hand, when the distance between the magnetic poles is too short, the cogging torque is reduced, but a short circuit of the magnetic flux between the magnets is generated, an induced voltage is reduced, and thus a motor efficiency is degraded. Therefore, when determining the distance between the magnetic poles, many analyses or evaluations have been necessary, and due to the changed magnetic flux, the induced voltage is reduced, resulting in many cases in which the efficiency of the motor is degraded.

PATENT DOCUMENT (Patent document 1) Japanese Patent Application Laid-Open No. 2013-99193
(Patent document 2) Japanese Patent Application Laid-Open No. 2011-234601
(Patent document 3) Japanese Patent Application Laid-Open No. 2011-101595

DISCLOSURE

Technical Problem

The present invention is directed to providing a magnet-embedded motor with an excellent balance in all aspects including low vibration, high efficiency, and rigidity (high rotation) and a compressor having the magnet-embedded motor.

Technical Solution

One aspect of the present invention provides a magnet-embedded motor including a stator including a plurality of teeth formed toward a central axis, at an inner circumferential part of a yoke in a cylindrical shape and coils wound around the plurality of teeth, and a rotor rotatably installed in the stator, and including a plurality of magnetic poles configured of two permanent magnets and formed in a circumferential direction at regular intervals, wherein the rotor may further include outer flux barriers formed with air gaps and formed at each of radially outer ends of the two permanent magnets, and inner flux barriers formed with air gaps and formed at each of radially inner ends of the two permanent magnets, wherein the respective inner flux barriers of each of the two permanent magnets are spatially connected to each other.

Each of the plurality of magnetic poles may include the two permanent magnets arranged in a V-shape convexly toward the central axis.

The rotor may further include a rotor iron core having a plurality of holes formed along an outer circumference thereof so that the two permanent magnets are inserted into the holes, and the two permanent magnets may be arranged in a V-shape to be gradually separate from each other toward the radially outer side from a rotation center of the rotor iron core.

The magnet-embedded motor according to one aspect of the present invention may further include a bridge section formed along an outer circumferential surface of the rotor iron core, and the bridge section may be formed on the radially outer side further than the outer flux barrier.

The magnetic flux density of the bridge section may vary depending on a width dimension of the bridge section, and the magnetic flux density of the bridge section is set to be in a range of 1.8 to 1.9 T.

Since, in the magnet-embedded motor of the present invention, the inner flux barriers of the two permanent magnets arranged in a V-shape convexly toward the central axis are spatially connected to each other, the magnetic torque may be maximized. Therefore, the outer flux barriers are provided at radially outer ends of the two permanent magnets, and a magnetic flux density of the bridge section formed at the radially outer side further than the outer flux barriers is in a range of 1.8 to 1.9 T, and thus rotor rigidity and reluctance torque can be improved.

That is, according to the present invention, a motor with an excellent balance can be provided in all aspects with considerations given to low vibration, high efficiency, and rigidity (high rotation). Specific experimental data will be described below.

The magnet-embedded motor according to one aspect of the present invention is studied, and a configuration (a distance between magnetic poles) of reducing cogging torque based on a relation between the distance between magnetic poles and the width dimension of tooth is considered. The present invention shows that the distance between magnetic poles and the width dimension of tooth may have some special connection with each other in the terms of reducing cogging torque and suppressing reduction of the induced voltage.

That is, when a distance A between the magnetic poles is referred to as A and a width dimension of the tooth is referred to as B, a relation of $A = k \times B$ (k is in a range from 1.65 to 1.75) may be satisfied.

Therefore, since the distance A between the magnetic poles and the width dimension B of tooth satisfy a relation of $A = k \times B$ (k is in a range from 1.65 to 1.75), the induced voltage and cogging torque can be simultaneously reduced. The specific experimental data will be described below.

The distance between the magnetic poles may be a width dimension of a magnetic flux path formed between the outer flux barriers adjacent to each other.

The outer flux barrier may include a first space portion formed at the outer side in a planar direction of the corresponding permanent magnet from a radially outer end face of the permanent magnet, and a second space portion formed at the outer side of the V-shape further than the permanent magnet so that a width dimension of the bridge section is uniform.

Therefore, a shape of the outer flux barrier can be changed by being divided into the first space part and the second space part, and a shape of the bridge section can be changed by being divided into the first space part and the second space part.

The circumferential dimension of an outer end of the outer flux barrier may be equal to or greater than five times the width dimension of the bridge section.

An opening angle between the permanent magnets arranged in a V-shape may be from 100 to 120°, and while a vertex of the V-shape of the permanent magnets arranged in the V-shape is positioned on the center lines of the teeth, front end faces of the teeth positioned closest to the radially outer end of the permanent magnets may face respective inner parts of the permanent magnets arranged at an outer circumferential surface of the rotor in the V-shape.

Therefore, an area into which the magnetic flux is introduced can be ensured at the teeth positioned closest to the radially outer ends of the permanent magnet, and the magnetic flux flowing in the plurality of teeth can be uniform.

The magnet-embedded motor according to one aspect of the present invention may be configured so that 1.5 to 3 slots formed between the teeth are positioned to correspond to a separation between the magnetic poles adjacent to each other.

Therefore, 1.5 to 3 slots formed between the teeth may be positioned to correspond to the separation between magnetic poles adjacent to each other, and the output torque is increased, and thus a high rotation force can be increased. The specific experimental data will be described below.

In the magnet-embedded motor according to one aspect of the present invention, the radially inner ends of the two permanent magnets forming the magnetic poles are attached to each other.

Therefore, a d-axis inductance (Ld) is reduced, and reluctance torque and output torque can be increased.

A compressor having the above-described magnet-embedded motor or an air conditioner or a refrigerating device using the compressor can be also made as embodiments of the present invention.

Another aspect of the present invention provides a magnet-embedded motor, including a shaft rotating about a central axis, a stator including a plurality of teeth formed toward the central axis and coils wound around the plurality of teeth, and a rotor rotatably installed in the stator and including a plurality of magnetic poles, arranged in a V-shape convexly toward the central axis, in a circumferential direction at regular intervals, wherein the rotor may further include a rotor iron core including a plurality of magnet insertion holes formed along an outer circumference thereof, a plurality of permanent magnets inserted into the plurality of magnet insertion holes to form the plurality of magnetic poles, outer flux barriers formed at each of radially outer ends of the plurality of permanent magnets, and inner flux barriers formed at each of radially inner ends of the plurality of permanent magnets, and the plurality of permanent magnets are arranged in a V-shape to be gradually separate toward the diameter directional outer side from a rotation center of the rotor iron core.

Advantageous Effects

The magnet-embedded motor and the compressor with the magnet-embedded motor according to exemplary embodiments of the present invention can provide a motor with an excellent balance in all aspects with considerations given to low vibration, high efficiency, and rigidity (high rotation).

MODES OF THE INVENTION

Hereinafter, a first embodiment of the magnet-embedded motor according to the present invention will be described in detail with reference to accompanying drawings.

Figure 1:
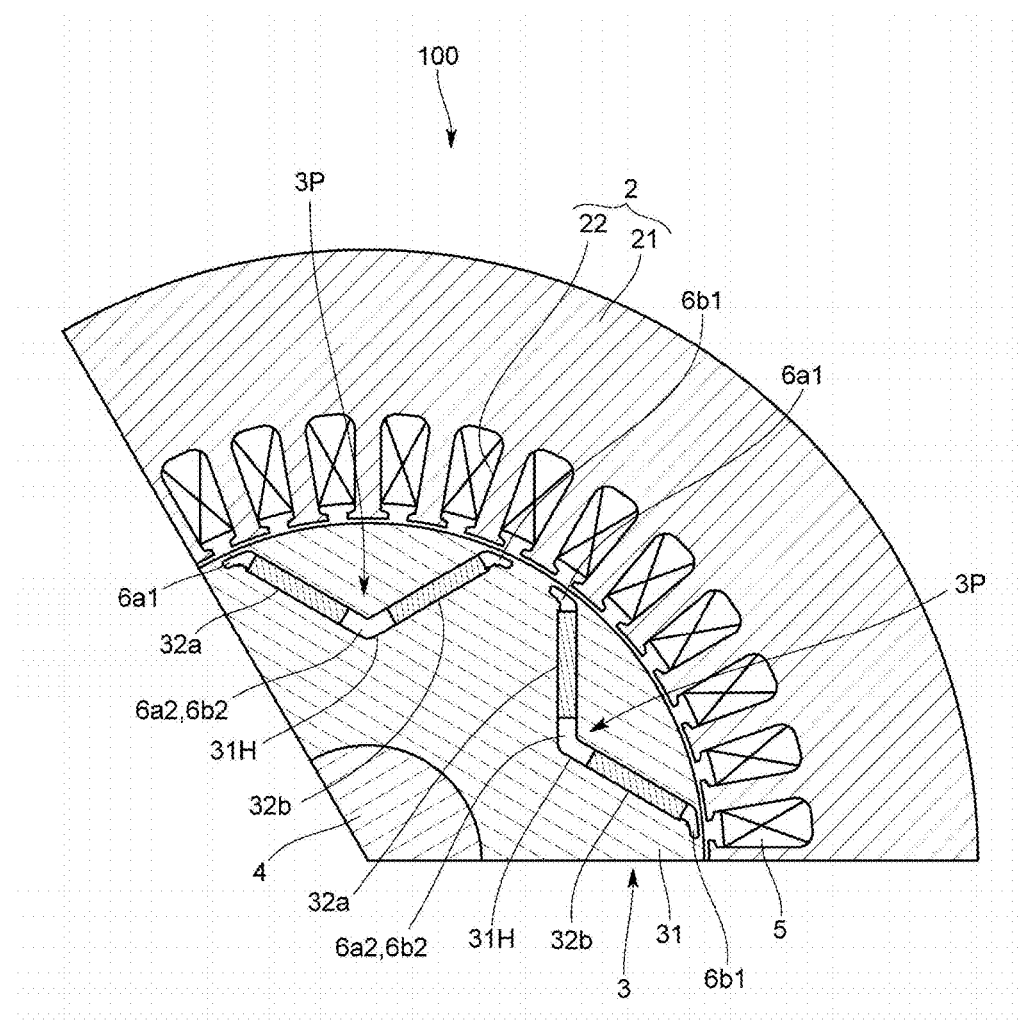
FIG. 1 is a partial schematic view illustrating a configuration of a magnet-embedded motor according to a first embodiment of the present invention.
Figure 2:
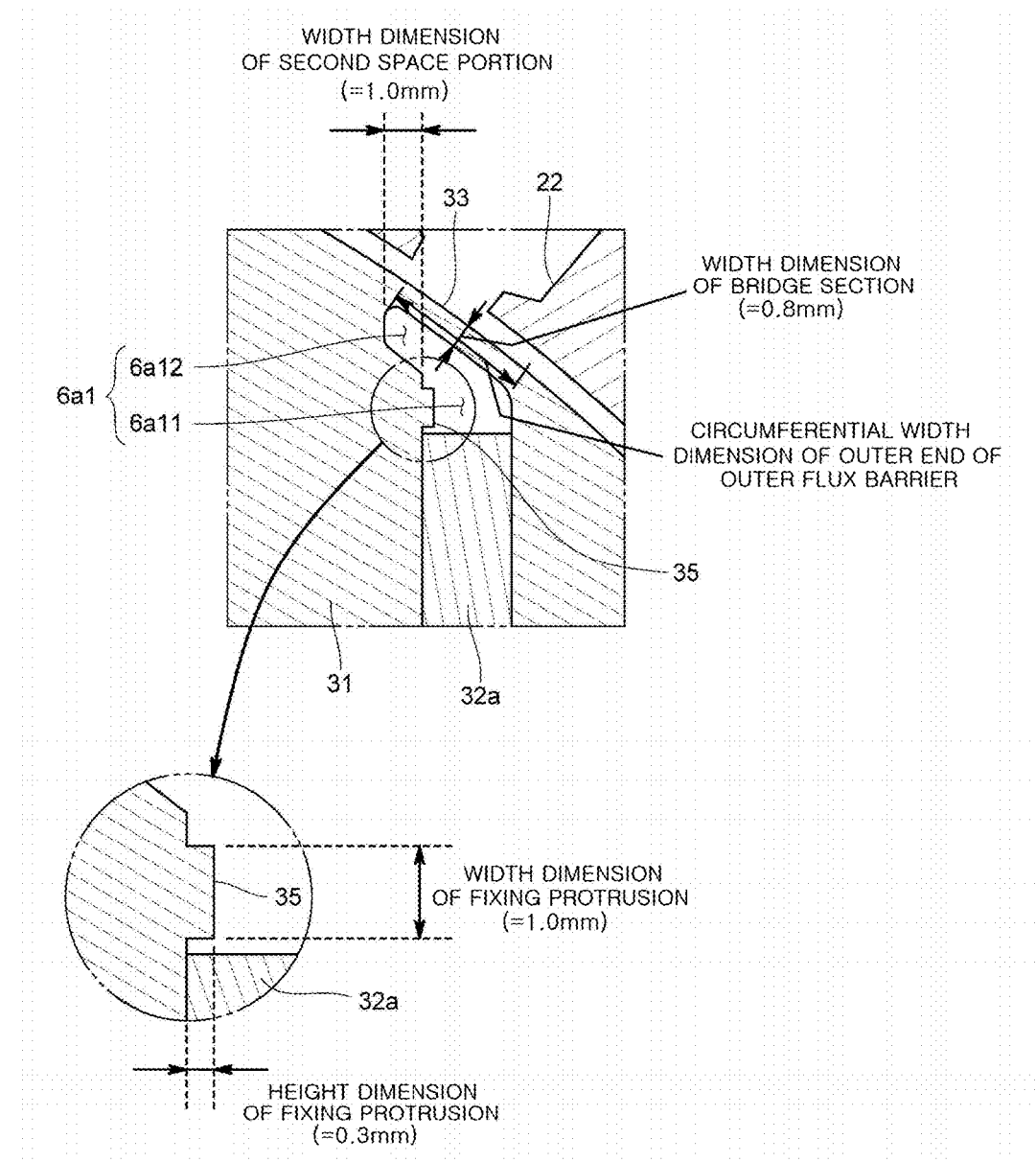
FIG. 2 is a partially enlarged cross-sectional view illustrating a specific shape of a flux barrier according to the first embodiment of the present invention.
Figure 3:
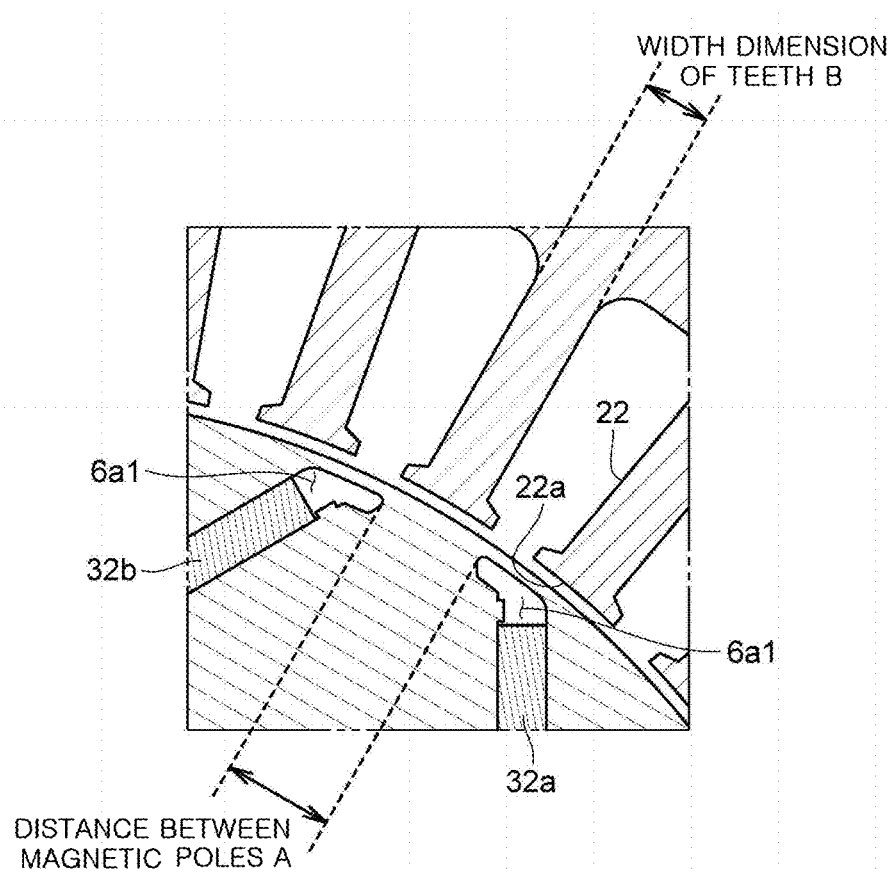
FIG. 3 is a partially enlarged cross-sectional view illustrating a relation between a distance between magnetic poles and a width dimension of a tooth in the magnet-embedded motor of the present invention.

However, reference numerals in the first embodiment are only used in FIGS. 1 to 3.

FIG. 1 is a partial schematic view illustrating a configuration of a magnet-embedded motor according to a first embodiment of the present invention, FIG. 2 is a partially enlarged cross-sectional view illustrating a specific shape of a flux barrier according to the first embodiment of the present invention, and FIG. 3 is a partially enlarged cross-sectional view illustrating a relation between a distance between magnetic poles and a width dimension of a tooth in the magnet-embedded motor according to the first embodiment of the present invention.

A magnet-embedded motor 100 according to the first embodiment of the present invention, for example, is a motor used in a compressor provided in a cooling cycle, and as shown in FIG. 1, includes a stator 2 including a plurality of teeth 22 (stator iron cores) around which stator coils 5 are wound, a rotor 3 rotatably installed in the stator 2, and a rotor shaft 4 (an output shaft) installed at the center of rotation of the corresponding rotor 3. However, power is supplied to the stator coils 5 through a lead wire.

Although, in FIG. 1, a motor with 36 slots and 6 poles is shown, a motor with 48 slots and 8 poles or the like is possible.

The stator 2 includes a yoke 21 having a cylindrical shape and a plurality of teeth 22 formed toward a central axis in an inner circumferential part of the yoke 21. In addition, the stator coils 5 are wound around the plurality of teeth 22 in a distributed winding manner.

The rotor 3 includes a rotor iron core 31 having a plurality of magnet insertion holes 31H formed along an outer circumference thereof and a plurality of permanent magnets 32a and 32b inserted into the plurality of magnet insertion holes 31H to form a plurality of magnetic poles 3P. Specifically, each of the magnetic poles 3P, as shown in FIG. 2, includes a first permanent magnet 32a and a second permanent magnet 32b convexly arranged around the central axis in a V-shape, respectively. Specifically, the first permanent magnet 32a and the second permanent magnet 32b are separated and arranged in the V-shape to gradually separate from each other radially outward away from the center of rotation of the rotor iron core 31.

An opening angle between the first permanent magnet 32a and the second permanent magnet 32b (an angle between the magnets) of the first embodiment of the present invention is configured to be within a range of 100 to 120°.

However, the magnet insertion holes 31H formed in the rotor iron core 31 are formed in a V-shape to gradually separate from each other radially outward away from the center of rotation of the rotor iron core 31.

The first permanent magnet 32a has a planar shape, and the outer flux barrier 6a1 and the inner flux barrier 6a2 formed with air gaps are formed at a radially outer end and a radially inner end, respectively. The outer flux barrier 6a1 and the inner flux barrier 6a2 are each formed at the same space as a space where the magnet insertion holes 31H are each formed, and are formed by inserting the first permanent magnet 32a into the magnet insertion hole 31H.

A shape of the outer flux barrier 6a1 formed at the radially outer end of the first permanent magnet 32a includes, as shown in FIG. 2, a first space portion ball formed on the outer side of the corresponding permanent magnet 32a along a planar direction starting from the radially outer end face of the first permanent magnet 32a and a second space portion 6a12 formed at the outer portion of the V-shape further than the first permanent magnet 32a, so that the width dimension of the bridge section 33 formed at an outer circumferential surface of the rotor iron core 31 is uniform.

The width dimension of the bridge section 33 of the first embodiment of the present invention, for example, is within a range of 0.3 to 1.2 mm. Also, a width dimension of the second space portion 6a12 formed at the outer side of the V-shape further than the first permanent magnet 32a, for example, is within a range of 0.0 to 1.0 mm. Also, a circumferential dimension of the outer end of the outer flux barrier 6a1 is equal to or greater than five times the width dimension of the bridge section 33.

Also, a fixing protrusion 35 for fixing the first permanent magnet 32a is formed in the first space portion 6a11 of the magnet insertion hole 31H. A height dimension of the fixing protrusion 35 is minimally set within a range for fixing the first permanent magnet 32a in order to reduce d-axis inductance (Ld). Also, by minimally setting the height dimension of protrusion 35 to reduce Ld, an area of the first space portion 6a11 is increased. The height dimension is determined based on a tolerance of the magnet insertion hole 31H dimension and a tolerance of the first permanent magnet 32a dimension and, for example, may be 0.3 mm. Also, the width dimension of the fixing protrusion 35 may be somewhat large to ensure rigidity for withstanding a centrifugal force of the first permanent magnet 32a and, for example, may be 1 mm. Further describing the width dimension, when a value is small, the rigidity may not be ensured, and on the contrary, when the value is too large, the d-axis inductance (Ld) becomes too large. Therefore, the width dimension is determined depending on a motor specification.

The second permanent magnet 32b has a planar shape identical to the shape of the first permanent magnet 32a, an outer flux barrier 6b1 and an inner flux barrier 6b2 formed with air gaps are formed at the radially outer end and the radially inner end of the second permanent magnet 32b. The outer flux barrier 6b1 and the inner flux barrier 6b2 are each formed at the same space as a space where the magnet insertion holes 31H are each formed, and are formed by inserting the second permanent magnet 32b into the magnet insertion hole 31H. The outer flux barrier 6a1 and the inner flux barrier 6a2 formed at both ends of the first permanent magnet 32a and the outer flux barrier 6a1 and the inner flux barrier 6a2 formed at both ends of the second permanent magnet 32b are formed with the same shape.

Also, in the first embodiment of the present invention, the inner flux barrier 6a2 of the first permanent magnet 32a and the inner flux barrier 6b2 of the second permanent magnet 32b are spatially connected to each other. That is, the inner flux barrier 6a2 and the inner flux barrier 6b2 are formed as a single space.

The magnet-embedded motor 100 of the first embodiment of the present invention is formed, as shown in FIG. 3, to satisfy a relation of A=k×B (k is in a range from 1.65 to 1.75) where a distance between the magnetic poles formed between the magnetic poles 3P adjacent to each other is referred to as A and width dimensions of the teeth 22 are referred to as B.

Here, the distance A between the magnetic poles is a width dimension of a magnetic flux path formed between the magnetic poles 3P adjacent to each other, and more specifically, is a width dimension of a magnetic flux path formed between the flux barrier 6a1, formed at the radially outer end of the first permanent magnet 32a of one magnetic pole 3P of the magnetic poles 3P adjacent to each other, and the flux barrier 6b1 formed at the radially outer end of the second permanent magnet 32b of the other magnetic pole 3P thereof.

Also, in the magnet-embedded motor 100 of the first embodiment of the present invention, while a vertex of the V-shape of the permanent magnets 32a and 32b arranged in the V-shape is positioned on the center lines of teeth (as shown in FIG. 1), front end faces 22a of the teeth 22 positioned closest to each of the radially outer ends of the first permanent magnet 32a and the second permanent magnet 32b face inner parts (an inner part of the V-shape) of the permanent magnets 32a and 32b arranged in the V-shape at the outer circumferential surface of the rotor 3 (see FIG. 3). Therefore, the magnet-embedded motor 100 is formed to uniformly make the magnetic flux flowing in the plurality of teeth 22 by securing an area into which the magnetic flux is introduced at the teeth 22 positioned closest to the radially outer ends of the permanent magnets 32a and 32b.

Figure 4:
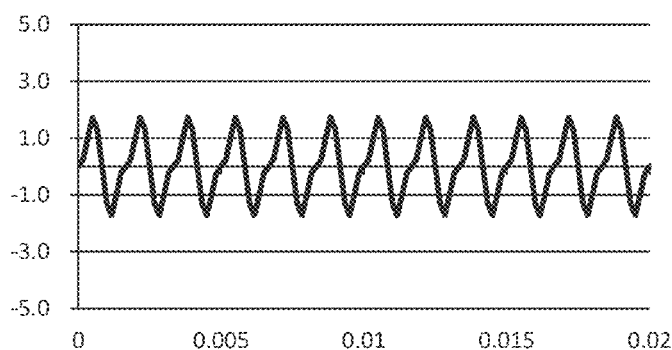
FIG. 4 is a view illustrating a simulation result of cogging torque when a coefficient k is determined to be 1.91, 1.7, and 1.45 in the magnet-embedded motor of the present invention.
Figure 4:
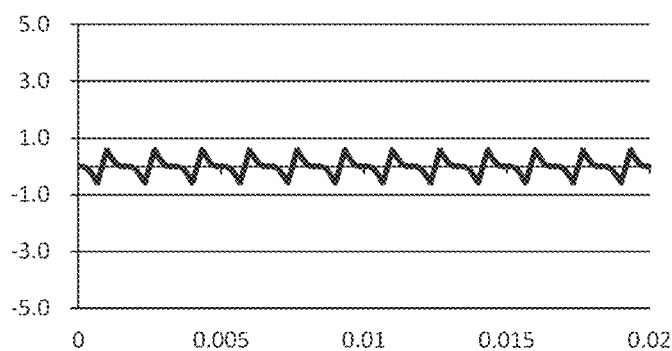
Figure 4:
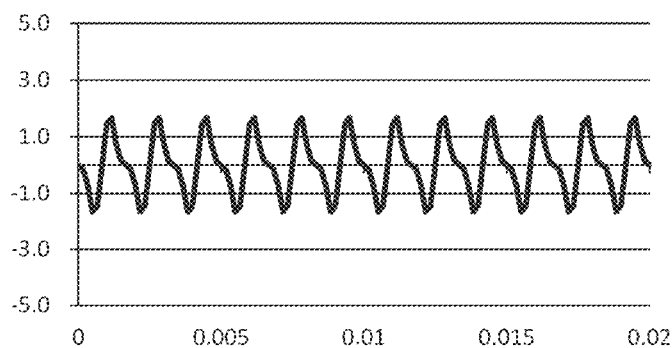

Next, a simulation result of cogging torque when coefficients k are determined to be 1.91, 1.7, and 1.45 in the magnet-embedded motor 100 of the first embodiment of the present invention is shown in FIG. 4.

Figure 5:
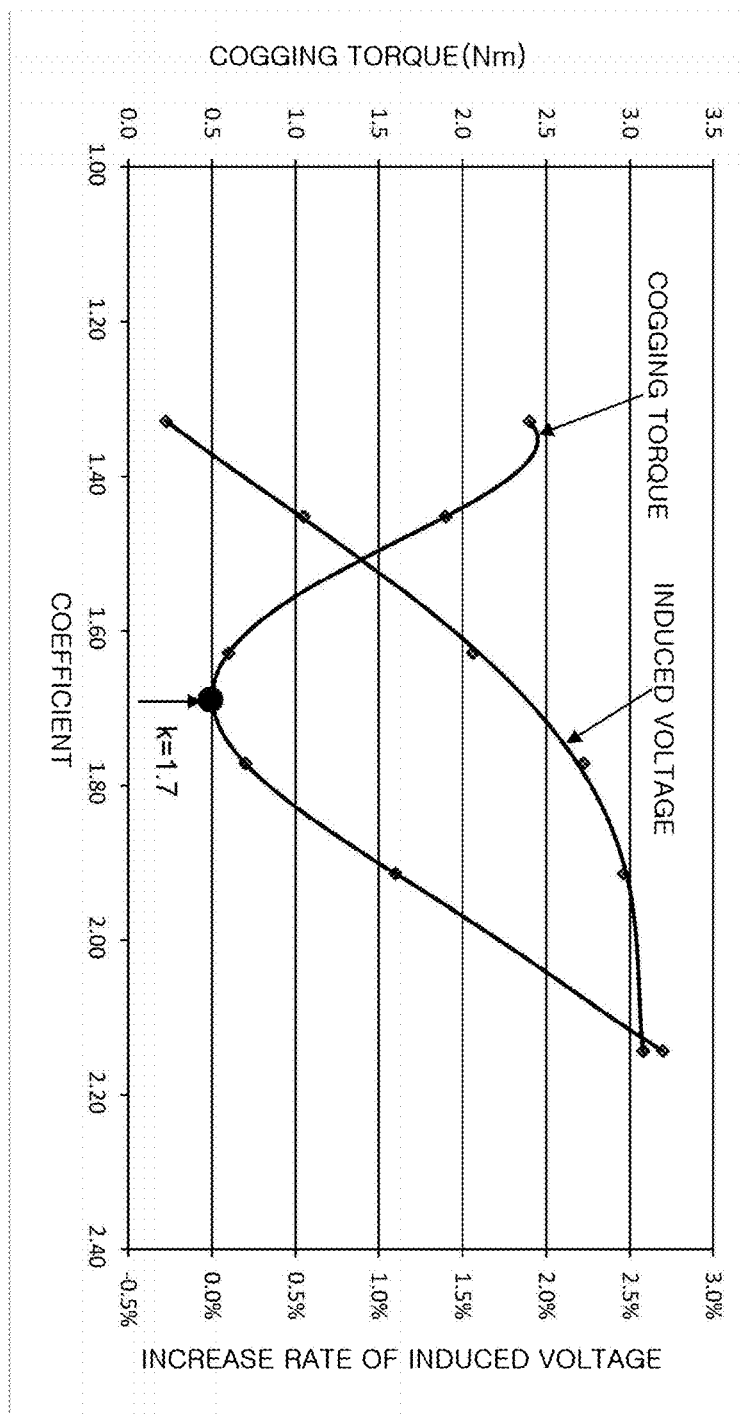
FIG. 5 is a view illustrating a relation among a distance (coefficient k) between the magnetic poles, a cogging torque, and an increase rate of an induced voltage in the magnet-embedded motor of the present invention.

FIG. 4 is a view illustrating a simulation result of cogging torque when a coefficient k is determined to be 1.91, 1.7, and 1.45 in the magnet-embedded motor of the present invention, and FIG. 5 is a view illustrating a relation among a distance (coefficient k) between the magnetic poles, the cogging torque, and an increase rate of an induced voltage in the magnet-embedded motor of the present invention.

FIG. 5 shows a simulation result of the cogging torque and an increase rate of an induced voltage when the coefficients k (a distance between the magnetic poles) is changed in FIG. 4.

In the simulation, the opening angle between the first permanent magnet and the second permanent magnet is 120°, a width dimension of the bridge section is 0.8 mm, a width dimension of the second space portion is 1.0 mm, a width dimension of a fixing protrusion is 1.0 mm, and a height dimension of the fixing protrusion is 0.3 mm.

As shown in FIGS. 4 and 5, when the distance A between the magnetic poles becomes small, the cogging torque also becomes small, but the distance A between the magnetic poles is minimized to a predetermined value (k=1.7). When the distance A between the magnetic poles becomes smaller than k=1.7, a phase change causes the cogging torque to increase again.

Also, as shown in FIG. 5, when the coefficient k is 1.7, the cogging torque is minimized, the coefficient k of 1.7 is an optimum value that makes the magnetic flux easily flow, and also the induced voltage is not reduced. That is, the coefficient k of 1.7 is the most preferred and may be in a range of 1.65 to 1.75 in consideration of an unevenness of a mold, etc.

Also, FIG. 5 shows that the cogging torque depends on width dimensions B of the teeth, and the coefficient k is a coefficient that determines a compensated width based on the width dimension B of teeth for minimizing the cogging torque.

Figure 6:
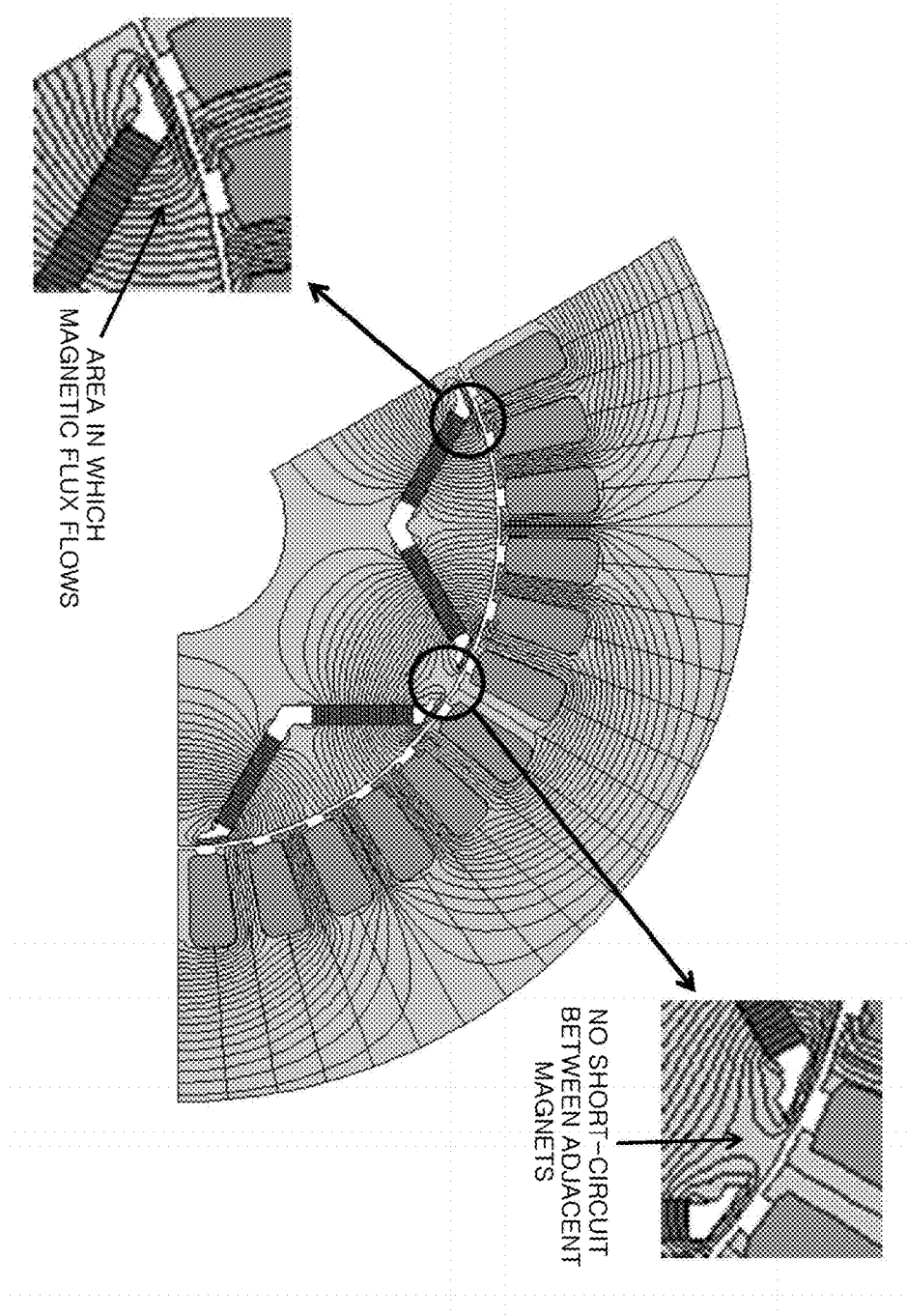
FIG. 6 shows magnetic flux when there is no load in the magnet-embedded motor according to the first embodiment of the present invention.

Also, a magnetic flux flow is shown in FIG. 6 when there is no load in the magnet-embedded motor 100 having a coefficient k of 1.7.

FIG. 6 shows magnetic flux when there is no load in the magnet-embedded motor according to the first embodiment of the present invention.

FIG. 6 shows that a short circuit of the magnetic flux does not occur between the magnetic poles, that is, between the first permanent magnet 32a at one magnetic pole and the second permanent magnet 32b at the other magnetic pole.

Also it can be ascertained that the magnetic flux sufficiently flows into the magnetic flux of teeth positioned closest to the radially outer ends of the permanent magnets 32a and 32b.

As shown in the first embodiment of the present invention, in a configuration in which the inner flux barrier 6a2 and the inner flux barrier 6b2 are spatially connected to each other, that is, in a configuration in which a center rib is not formed between the two permanent magnets 32a and 32b, a portion positioned on the radially outer portion further than the two permanent magnets 32a and 32b is the portion maintained by the bridge section 33. That is, a stress by a centrifugal force is concentrated on the bridge section 33.

Here, the conventional magnet-embedded motor is used by saturating the magnetic field (2.0±0.1T) at the radially outer ends of the permanent magnets 32a and 32b to sufficiently use the reluctance torque. However, there is a need for the bridge section 33 to be narrow for using the motor by the magnetic saturation, and since it is hard to ensure rigidity (mechanical rigidity), the torque ripple is increased during rotation, thereby causing a poor balance in a motor and particularly causing a performance weakness at a high rotation area.

Figure 7:
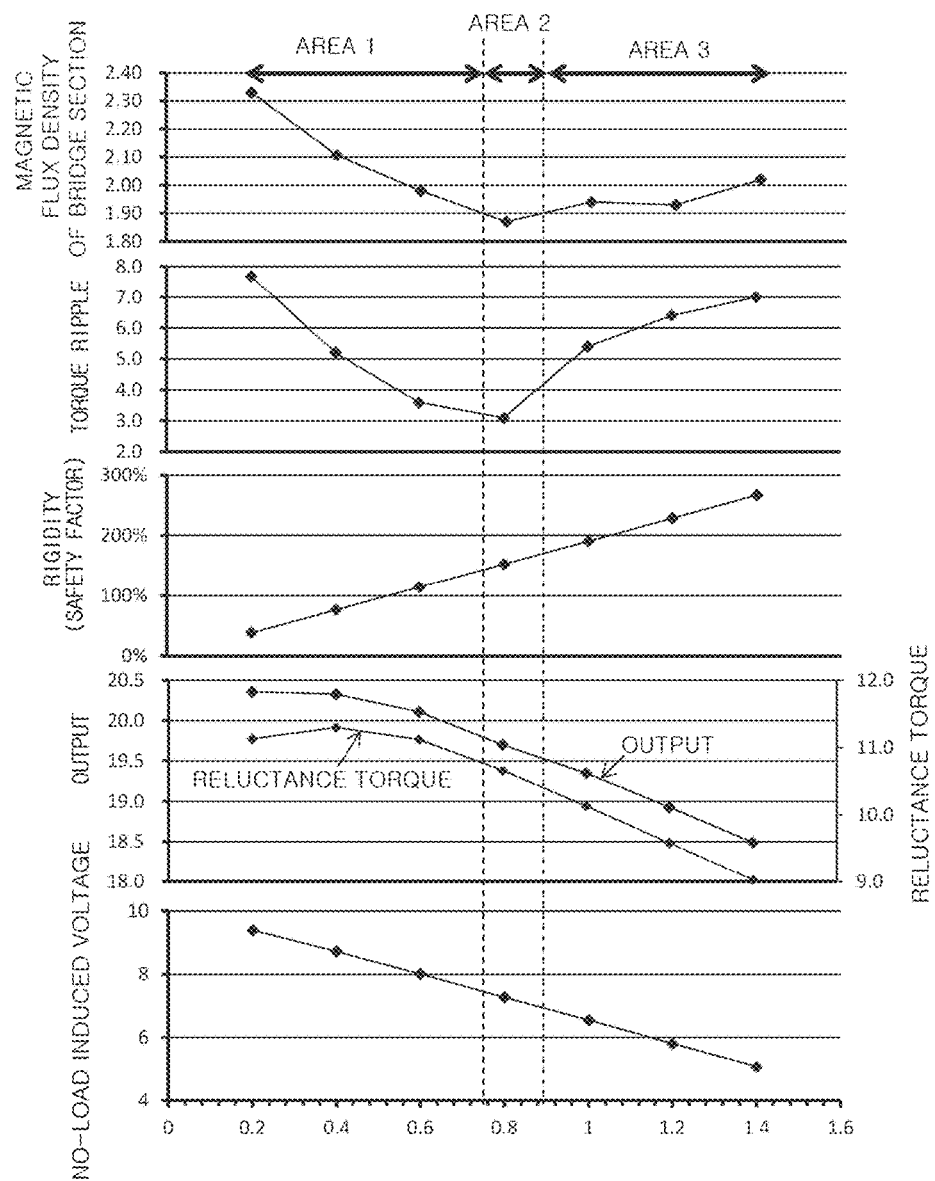
FIG. 7 is a view illustrating simulation results showing dependences of a magnetic flux density and the like versus width dimension of a bridge section in the magnet-embedded motor of the present invention.

Next, a simulation result of a magnetic flux density of the bridge section, torque ripple, rigidity (a safety factor), a motor output, and a no-load induced voltage when only the width dimension of the bridge section 33 is changed in the magnet-embedded motor 100 of the first embodiment of the present invention is shown in FIG. 7.

FIG. 7 is a view illustrating simulation results showing dependences of a magnetic flux density and the like versus width dimension of a bridge section in the magnet-embedded motor of the present invention.

In FIG. 7, only a width dimension of the bridge section 33 is changed in the configuration of the magnet-embedded motor 100, and the shapes and conditions of others thereof are not changed.

The magnetic flux density of the bridge section 33 is reduced due to a magnetic resistance reduction for the width dimension of the bridge section 33 from 0.2 to 0.8 mm, but the magnetic flux tends to increase due to an increase in leaked magnetic flux of the permanent magnets 32a and 32b for the width dimension from 0.8 to 1.4 mm.

The torque ripple tends to be reduced according to reduction of reluctance torque for the width dimension of the bridge section 33 of 0.2 to 0.8 mm but contrastingly tends to increase due to an influence of an increase in cogging or the leaked magnetic flux from the magnets for the width dimension of the bridge section 33 of 0.8 to 1.4 mm.

Since the rigidity (a safety factor) is proportional to an area of the bridge section 33, the same property is increased in proportional to an increase in the width dimension of the bridge section 33.

However, in a method of calculating a safety factor when the width dimension of the bridge section 33 is 0.8 mm, since a damage is detected at 210 Hz with respect to a maximum rated rotation speed of 140 Hz, a safety factor is 1.5 (=210/140) for the width dimension of the bridge section 33 of 0.8 mm.

Since the reluctance torque or magnetic torque is reduced according to the increase in the width dimension of the bridge section 33, the motor has reduced output.

Since the leaked magnetic flux of the permanent magnets 32a and 32b is increased according to an increase in the width dimension of the bridge section 33, a no-load induced voltage is reduced.

As a result, in an area 1 (an area in which the width dimension of the bridge section is less than 0.745 mm and the magnetic flux density is greater than 1.9 T), while the motor output is high, a torque ripple is high, and it is hard to ensure rigidity.

Also, in an area 3 (an area in which the width dimension of the bridge section is greater than 0.885 mm and the magnetic flux density is greater than 1.9 T), the magnetic flux density is increased only due to a magnetic flux concentration caused by the magnetic short circuit, and while it is easy to ensure rigidity, a motor output or a property of torque ripple is quite poor.

Meanwhile, in an area 2 (an area in which the width dimension of the bridge section is in a range from 0.745 to 0.885 mm and the magnetic flux density is 1.9 T or less), the motor output tends to be reduced compared to in the area 1, but the torque ripple is reduced, and it is easy to ensure rigidity. However, the minimum value of the magnetic flux density in the area 2 is 1.87 T, and in this case, the width dimension of the bridge section 33 is 0.8 mm.

Therefore, since the magnet-embedded motor 100 of the first embodiment of the present invention is set or used so that the magnetic flux density of the bridge section 33 is in a range of 1.8 to 1.9 T, a balance between low vibration, high efficiency, and rigidity (high rotation) can be optimized.

According to the magnet-embedded motor 100 configured above, since the two inner flux barriers 6a2 and 6b2 of two permanent magnets 32a and 32b convexly arranged around a central axis in a V-shape are spatially connected to each other, the magnetic torque may be maximized Therefore, when the outer flux barriers 6a1 and 6b1 are provided at the radially outer ends of the two permanent magnets 32a and 32b and the magnetic flux density of the bridge section 33 formed at the radially outer portion further than the outer flux barriers 6a1 and 6b1 is in a range of 1.8 to 1.9 T, and thus the rigidity and reluctance torque of the rotor 3 can be increased. That is, the motor can be outstandingly balanced in all aspects including low vibration, high efficiency, and rigidity (high rotation).

Also, since the distance A between the magnetic poles and the width dimensions of the teeth B satisfy the relation A=k×B (k is in a range from 1.65 to 1.75), the cogging torque can be reduced while suppressing the reduction of the induced voltage.

Second Embodiment

Hereinafter, the second embodiment of the magnet-embedded motor according to the present invention will be described in detail with reference to accompanying drawings.

However, reference numerals in the second embodiment are reference numerals only used in FIGS. 8 to 15.

Figure 8:
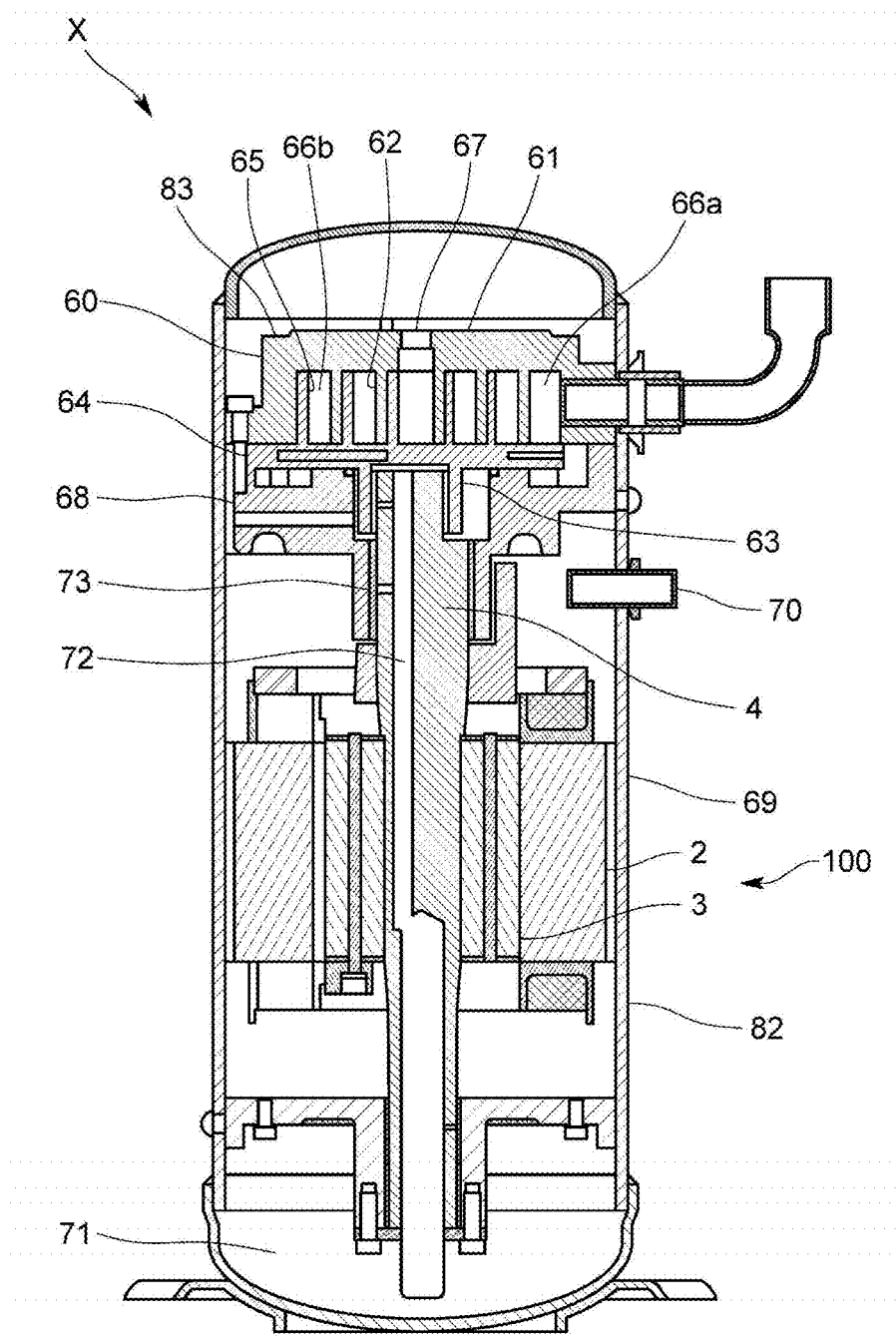
FIG. 8 is a view schematically illustrating a configuration of a compressor using a magnet-embedded motor according to a second embodiment of the present invention.
Figure 9:
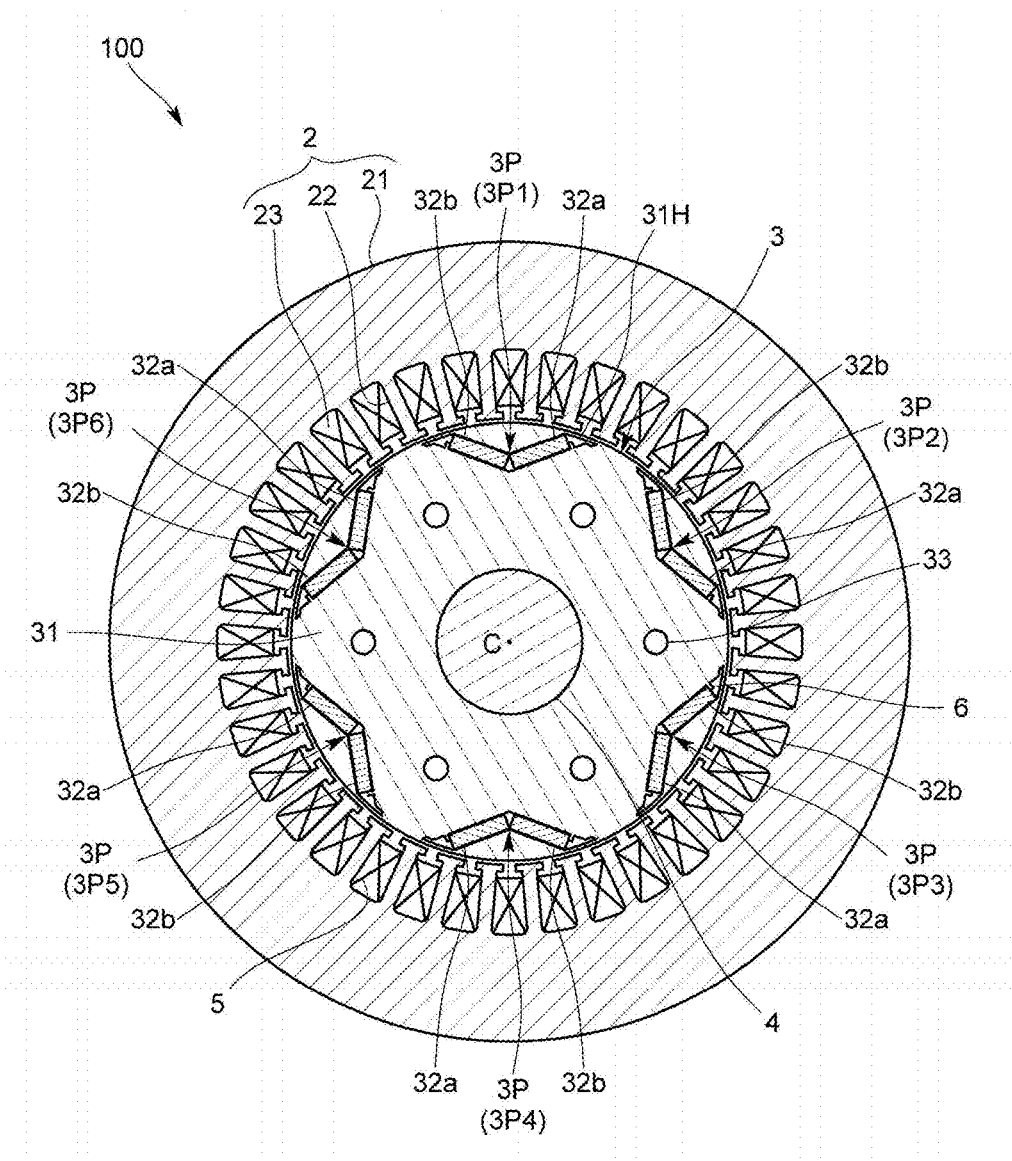
FIG. 9 is a view schematically illustrating a configuration of the magnet-embedded motor according to the second embodiment of the present invention.
Figure 10:
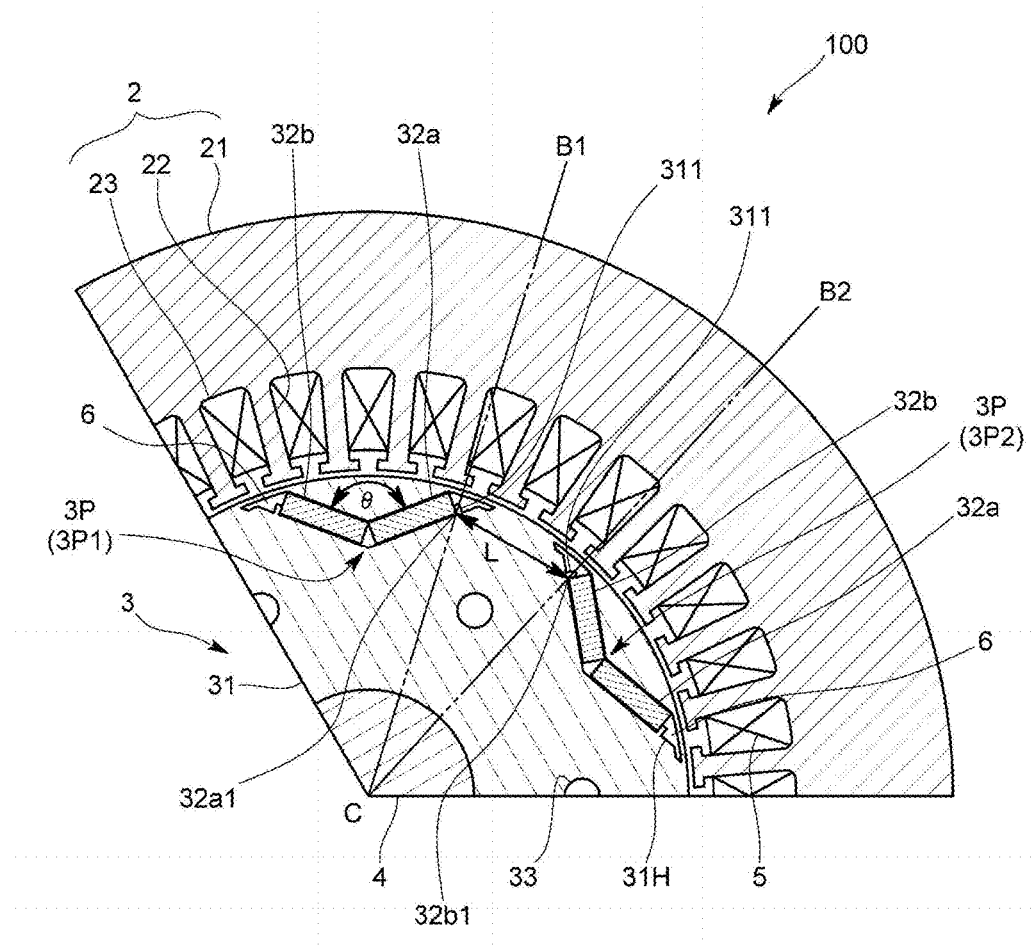
FIG. 10 is an enlarged view illustrating the magnet-embedded motor according to the second embodiment of the present invention.

FIG. 8 is a view schematically illustrating a configuration of a compressor using a magnet-embedded motor according to a second embodiment of the present invention, FIG. 9 is a view schematically illustrating a configuration of the magnet-embedded motor according to the second embodiment of the present invention, and FIG. 10 is an enlarged view illustrating the magnet-embedded motor according to the second embodiment of the present invention.

The magnet-embedded motor 100 according to the second embodiment of the present invention, as shown in FIG. 8, is a permanent magnet synchronous motor used for a compressor X provided, for example, in a cooling cycle of an air conditioner, etc.

Specifically, the permanent magnet synchronous motor 100 of the present invention includes, as shown in FIG. 9, a stator 2 having a plurality of teeth 22 around which stator coils 5 are wound and a plurality of slots 23 formed between the teeth 22, a rotor 3 rotatably installed in the stator 2, and a rotor shaft 4 installed at the rotation center C of the rotor 3. However, power is supplied to the stator coils 5 through a lead wire.

Meanwhile, in FIG. 9, a motor with 36 slots and 6 poles (a motor in a combination of 6:1) is shown as an example, but a motor with 48 slots and 8 poles or a motor in a combination of 8:1 or 9:1 may be possible.

The stator 2 includes a yoke 21 configured as a stack of electronic steel sheets and having a cylindrical shape, a plurality of teeth 22 formed in the inner circumferential part of the yoke 21 toward the central axis, and a plurality of slots 23 formed between the teeth 22 adjacent to each other. For example, stator coils 5 which are 3-phase coils are wound around the plurality of teeth 22 in a distributed winding manner. The 3-phase coils are configured so that the number of coil winding of each phase is the same.

The teeth 22 are formed in a circumferential direction at regular intervals. The shape of each of the teeth 22 is the same. Therefore, the slots 23 are also formed in a circumferential direction at regular intervals, and the shapes of each of the slots 23 are the same.

The rotor 3 is configured by stacking electronic steel sheets with a stacking thickness approximately the same as that of the stator 2 and includes a rotor iron core 31 having the plurality of magnet insertion holes 31H formed along an outer circumference thereof and a plurality of permanent magnets 32a and 32b inserted into the plurality of magnet insertion holes 31H to form the plurality of magnetic poles 3P.

More specifically, the rotor 3 of the second embodiment of the present invention includes six magnetic poles 3P, and the magnetic poles 3P are arranged in a circumferential direction at regular intervals.

However, the rotor 3 in the second embodiment of the present invention includes a plurality of through hole 33 penetrating the rotor iron core 31 in a thickness direction and is configured to be fixed by inserting fixing pins, not shown, into the through holes 33.

Each of the above-described magnetic poles 3P, as shown in FIGS. 9 and 10, includes the first permanent magnet 32a and the second permanent magnet 32b convexly arranged around the central axis in a V-shape.

Specifically, the first permanent magnet 32a and the second permanent magnet 32b are separated and arranged in the V-shape to gradually separate from each other radially outward away from the rotation center C of the rotor iron core 31. The first permanent magnet 32a and the second permanent magnet 32b of the second embodiment of the present invention each have a rectangular shape and are arranged so that an S pole of one permanent magnet 32a or 32b and an N pole of the other permanent magnet 32b or 32a are magnetized and are in contact with each other at the same time. Also, the opening angle (θ; magnet angle) between the permanent magnets 32a and 32b satisfies 90°<θ<160°, and each of the permanent magnets 32a and 32b is arranged so that the opening angle θ becomes 120° according the embodiment of the present invention.

The magnet insertion holes 31H formed in the rotor iron core 31 are arranged to be gradually separate in the V-shape from each other radially outward away from the rotation center of the rotor iron core 31. In the embodiment, fixing protrusions 311 protruding inward from outer circumferential frames of the magnet insertion holes 31H are formed to prevent the permanent magnets 32a and 32b from moving in the magnet insertion holes 31H. Specifically, the fixing protrusions 311 are installed on radially outer portion further than each of the permanent magnets 32a and 32b in the magnet insertion holes 31H.

Hereinafter, for the sake of convenience of description, when each of the above-described magnetic poles 3P is distinguished, as shown in FIGS. 9 and 10, the magnetic poles 3P will each be marked as the magnetic pole 3P1 to the magnetic pole 3P6.

The first permanent magnet 32a and the second permanent magnet 32b have a planar shape and are rare earth magnets or ferrite magnets made of rare earth as a main component. Flux barriers 6 formed with air gaps are formed at the radially outer ends of the permanent magnets 32a and 32b.

The flux barriers 6 are each formed at the same space as a space where the magnet insertion holes 31H are each formed, and are formed by inserting the first permanent magnet 32a or the second permanent magnet 32b into the magnet insertion hole 31H. In the embodiment, a distance between the flux barriers 6 and an outer circumference of the rotor iron core 31 is smaller than the widths of the flux barriers 6 and specifically are set to be 1.2 mm or less.

The permanent magnet synchronous motor 100 of the embodiment, as shown in FIG. 10, is configured so that 1.5 to 3 slots 23 are positioned to correspond to the separation between the magnetic poles 3P adjacent to each other.

For example, as shown in FIG. 10, a separation between the magnetic pole 3P1 and the magnetic pole 3P2 adjacent to each other corresponds to a separation between the first permanent magnet 32a forming a magnetic pole 3P1 and the second permanent magnet 32b forming the magnetic pole 3P2. More specifically, a distance L between the magnetic poles 3P1 and 3P2 is defined as a separation between a radially outer edge 32a1 of the first permanent magnet 32a and the radially outer edge 32b1 of the second permanent magnet 32b.

It is evident that the distances L between the magnetic poles are the same between the magnetic poles 3P adjacent to each other.

Based on the above-described definition, when the centers of the slots 23 in the stator 2 are positioned on extensions of lines for connecting the rotation center C of the rotor iron core 31 and the centers of the magnetic poles 3P (a part where the first permanent magnet contacts the second permanent magnet), the permanent magnet synchronous motor 100 of the embodiment is configured so that 1.5 to 3 slots 23 are positioned to correspond to a separation between the magnetic poles 3P adjacent to each other.

To be specific, the permanent magnet synchronous motor 100 of the embodiment, for example, is configured so that 1.5 to 3 slots 23 are positioned between a first imaginary line B1 for connecting a radially outer edge part 32a1 of the first permanent magnet 32a forming the magnetic pole 3P1 with the rotation center C and a second imaginary line B2 for connecting the radially outer edge part 32b1 of the second permanent magnet 32b forming the magnetic pole 3P2 with the rotation center C.

Here, although the number of slots 23 corresponding to a separation between the magnetic pole 3P1 and the magnetic pole 3P2 is described, the number of slots 23 corresponding to the separation between magnetic poles 3P adjacent to each other are also the same.

Figure 11:
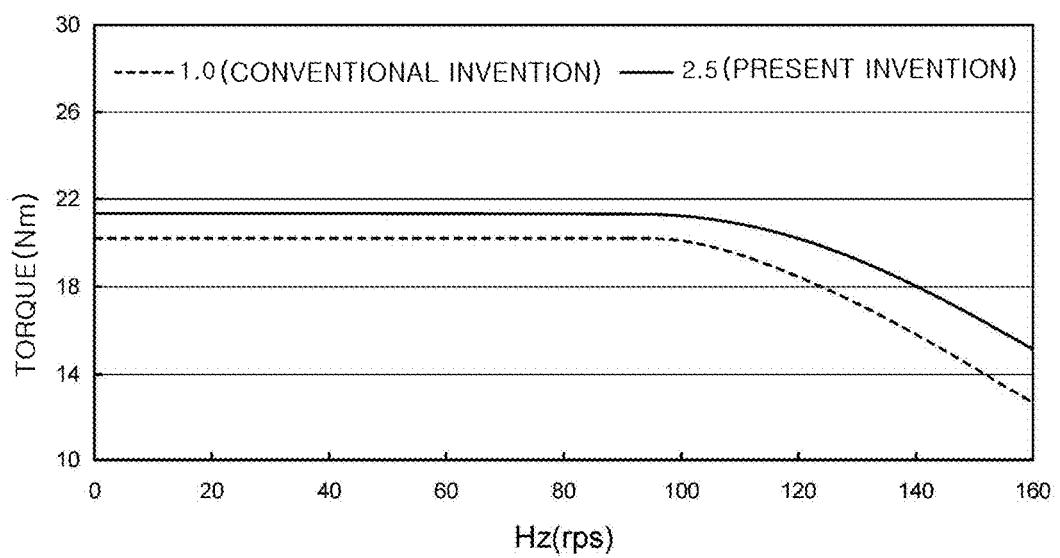
FIG. 11 is a view illustrating a correlation between a rotation speed of the motor and output torque.

Next, a simulation result of a correlation between the rotation speed of the motor and the output torque in the cases in which the number of slots arranged to correspond to a separation between the magnetic poles 3P are 1.0 (the conventional invention) and 2.5 (the present invention) in the permanent magnet synchronous motor 100 of the embodiment is shown in FIG. 11.

Figure 12:
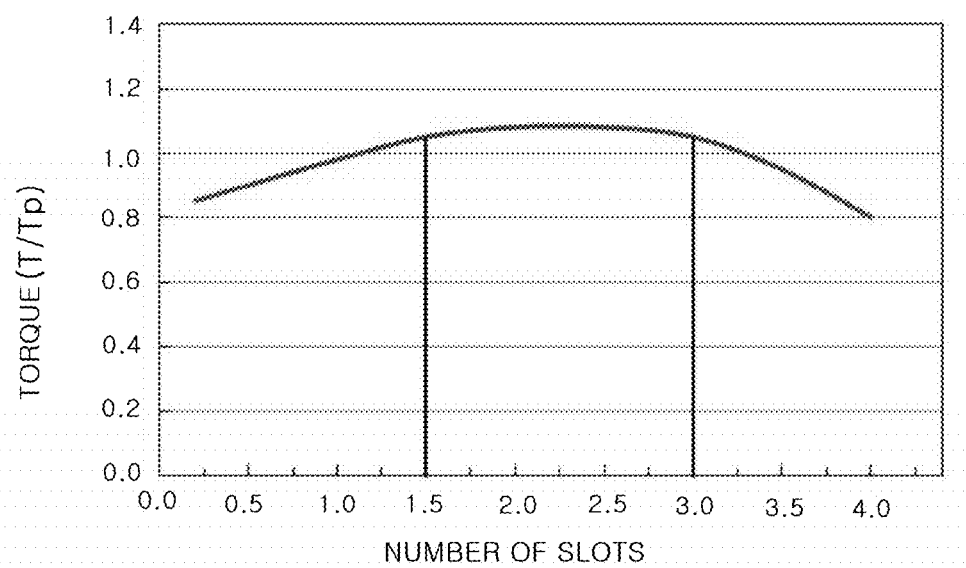
FIG. 12 is a view illustrating a correlation between the number of slots between the magnetic poles and output torque.

FIG. 11 is a view illustrating a correlation between a motor rotation speed and the output torque, and FIG. 12 is a view illustrating a correlation between the output torque and the number of slots corresponding to a separation between the magnetic poles.

A simulation result of the output torque in a case in which the number of slots arranged to correspond to a separation between the magnetic poles 3P varies in a range from 0.0 to 4.0 in FIG. 11 is shown in FIG. 12.

However, an opening angle θ between the first permanent magnet 32a and the second permanent magnet 32b is 120° in the simulation.

As shown in FIG. 11, at the same rotation speed of the motor, the output torque is increased when (the present case) the number of slots arranged to correspond to a separation between the magnetic poles 3P is 2.5 compared to when (the conventional case) the number of slots arranged to correspond to a separation between the magnetic poles 3P is 1.0. The tendency is particularly remarkable as the rotation speed is increased toward a high speed area.

Also, as shown in FIG. 5, when the number of slots arranged to correspond to a separation between the magnetic poles 3P is 2.25, the output torque is maximized. That is, the number of slots 23 arranged to correspond to a separation between the magnetic poles 3P is preferably 2.25 or may be in a range of 1.5 to 3.0 in consideration of an unevenness of a mold, etc.

Subsequently, a compressor X using the permanent magnet synchronous motor 100 of the second embodiment of the present invention and a cooling cycle of, for example, an air conditioner including the compressor X will be described with reference to FIGS. 8 to 13.

Figure 13:
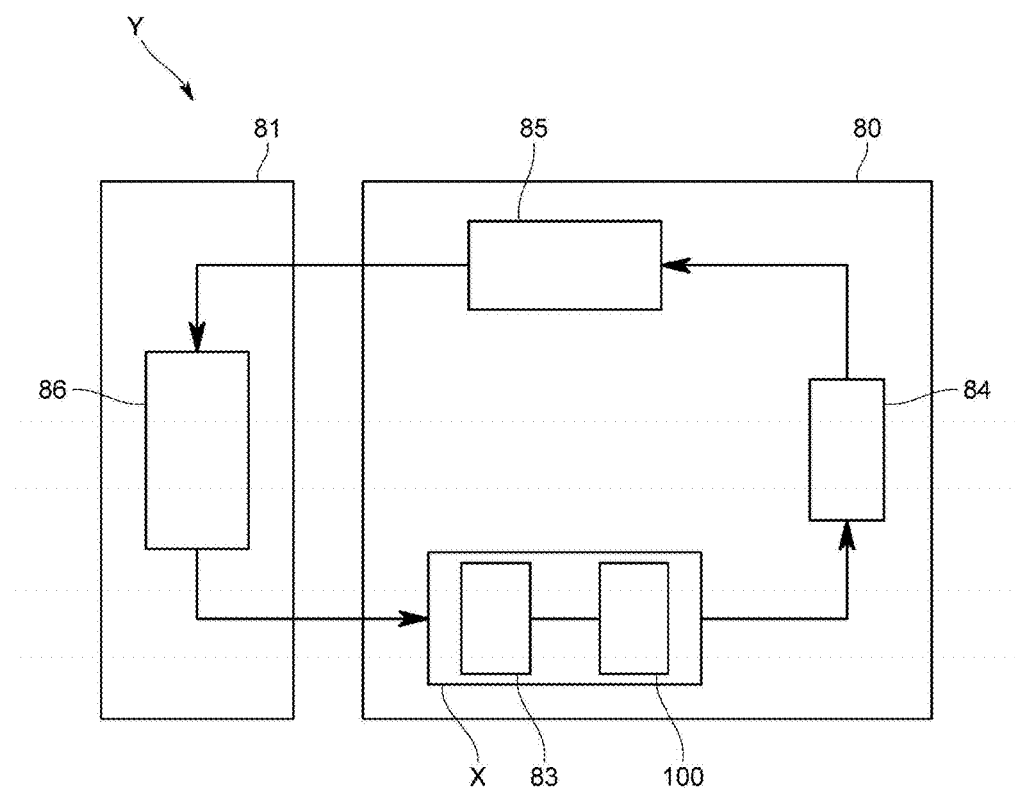
FIG. 13 is a view illustrating a cooling cycle including the compressor using the magnet-embedded motor according to the second embodiment of the present invention.

FIG. 13 is a view illustrating a cooling cycle including the compressor using the magnet-embedded motor according to the second embodiment of the present invention.

A cooling cycle Y, as shown in FIG. 13, includes the compressor X, an outdoor unit 80 including a condenser 84 and an expansion valve 85, and an indoor unit 81 including an evaporator 86.

The cooling cycle Y is configured to perform a cooling function by performing a heat-exchange between the outdoor unit 80 and the indoor unit 81 by sequentially circulating a coolant compressed by the compressor X through the compressor X, the condenser 84, the expansion valve 85, and the evaporator 86.

The compressor X, as shown in FIGS. 8 and 13, includes a compressor unit 83 and the permanent magnet synchronous motor 100 configured as described above.

The compressor unit 83, particularly as shown in FIG. 8, is formed so that a spiral lap 62 erected on an end plate 61 of a fixed scroll member 60, and a spiral lap 65 erected on an end plate 64 of a rotary scroll member 63 are engaged and is configured to perform a compression operation by rotating the rotary scroll member 63 using a crank shaft 4 (a rotor shaft).

Compression chambers 66a and 66b, positioned on the outermost circumferential sides among a plurality of compression chambers 66 formed with the fixed scroll member 60 and the rotary scroll member 63, move toward the respective centers of the scroll members 60 and 63 according to a rotary motion, and thus a volume is gradually contracted. Since the compression chambers 66a and 66b communicate with an outlet 67 when reaching near the centers of the scroll members 60 and 63, a compressed gas in the corresponding compression chambers 66a and 66b is discharged through the outlet 67.

The discharged compressed gas is discharged to the outside of the compressor X through a discharging pipe 70 installed at a side wall of a pressure container 69 when reaching a lower part of a frame 68 in a pressure container 69 through gas paths not shown and installed at the fixed scroll member 60 and the frame 68.

As described above, the permanent magnet synchronous motor 100 including a rotor 3 with a stator 2 is accommodated in the pressure container 69 and rotates to perform a compression operation by applying electricity to the 3-phase coil.

An oil unit 71 is installed at a lower part of the permanent magnet synchronous motor 100. By a pressure difference generated by a rotary motion, the oil in the oil unit 71, through an oil hole 72 installed in the crank shaft 4 (a rotor shaft), provides lubrication for a contact unit between the rotary scroll member 63 and the crank shaft 4 (a rotor shaft) and a sliding bearing 73, etc.

As described above, according to the permanent magnet synchronous motor 100 according to the configured-above embodiment, since 1.5 to 3 slots are positioned to correspond to a separation between the magnetic poles 3P adjacent to each other, the output torque is increased, and thus a high speed rotation force can be increased.

The high speed force in this context is in a range of 20 to 180 Hz (rps).

Also, since the first permanent magnet 32a and the second permanent magnet 32b are arranged to be in contact, the d-axis inductance (Ld) is reduced to allow the reluctance torque to increase and, even further increase the output torque.

Since an iron loss is reduced, efficiency can be increased.

Also, since the inductance is reduced, an electrical time constant is reduced, and thus a transient response is improved.

In addition, since a vibratory force is reduced, noise and vibration can be reduced.

Also, even when an armature current is increased, because the current and the output torque are in an approximately linear relation, a control response is excellent, and an application to the compressor is particularly easy.

Also, since the permanent magnet synchronous motor 100 configured as described above is applied to the compressor X as a compressor motor, the operation range expansion and high efficiency of the corresponding compressor X can be realized.

Also, since the cooling cycle Y has a high efficiency performance in a tight range of operation by applying the permanent magnet synchronous motor 100 configured as described above to the compressor forming the cooling cycle Y, an energy input can be reduced resulting in a reduction of discharging of carbon dioxide that causes in global warming.

Modified Example of the Second Embodiment

The present invention is not limited to the second embodiment.

Figure 14:
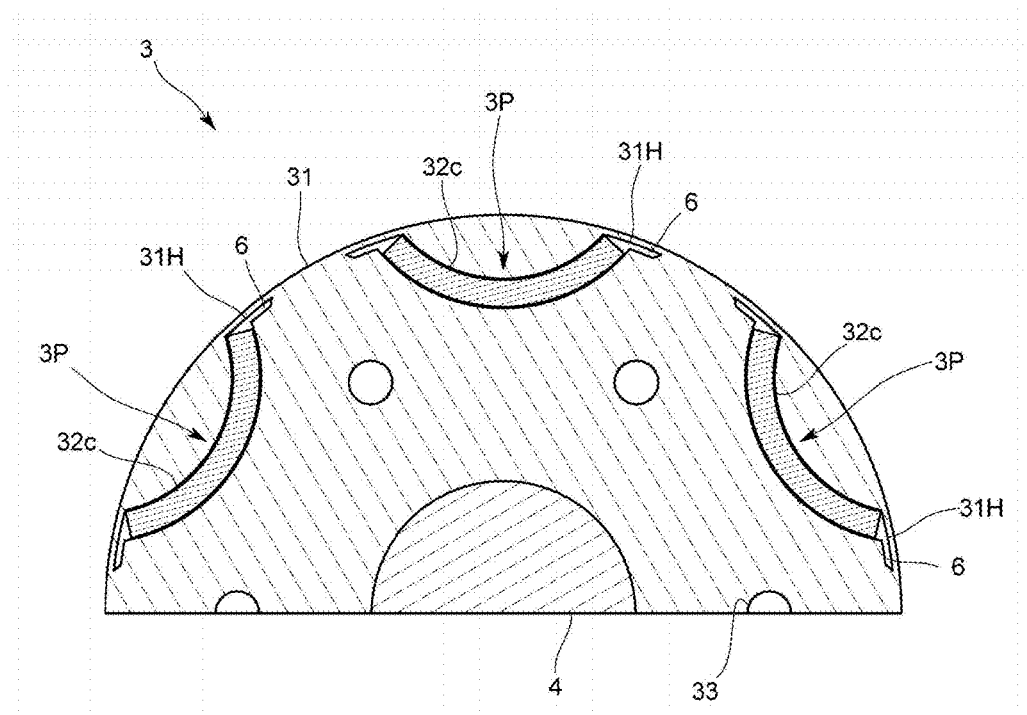
FIGS. 14 and 15 are schematic views illustrating magnet-embedded motors that are modifications of the second embodiment of the present invention.

For example, in the second embodiment, the magnetic poles 3P are configured by the first permanent magnet 32a and the second permanent magnet 32b arranged in a V-shape, but as shown in FIG. 14, a single permanent magnet 32c having an arc shape may be disposed curved toward the radially outer side. Even in this case, as in the first embodiment, it is preferable that the magnetic flux density be in a range of 1.8 to 1.9 T by changing the width dimension of the bridge section.

Figure 15:
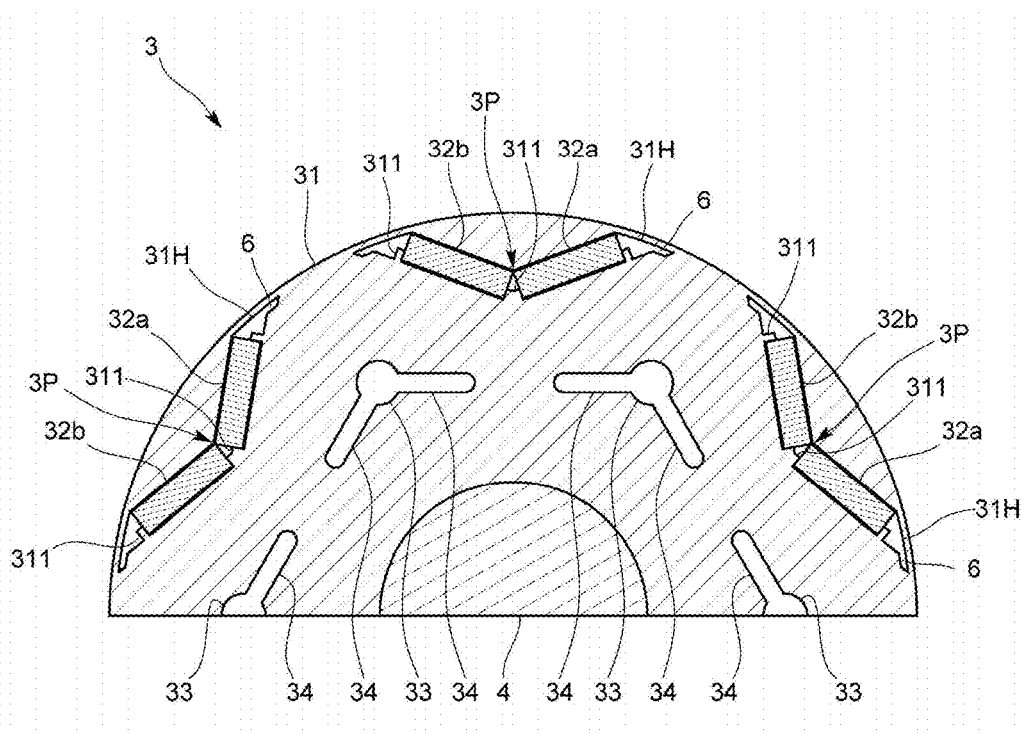

Also, in the second embodiment of the present invention, a through hole 33 through which a fixing pin not shown passes is formed in the rotor iron core 31, but as shown in FIG. 15, consecutive slit holes 34 may be formed on the through hole 33. However, although the two slit holes 34 are shown to be symmetrical from the through hole 33 in FIG. 15, the number of slit holes 34 is not limited to 2.

As described above, the rotor iron core 31 may be fixed and a flow of magnetic flux generated in the permanent magnets 32a and 32b may be controlled. Also, when the permanent magnet synchronous motor 100 is used for the compressor X, etc., by having the coolant pass through the slit holes 34, the stator can be cooled.

Also, in the second embodiment of the present invention, fixing protrusions 311 are formed in the magnet insertion holes 31H and are installed on radially outer portion further than each of the permanent magnets 32a and 32b but, as shown in FIG. 15, may be installed on the radially outer portion and radially inner portion further than each of the permanent magnets 32a and 32b.

Also, in the second embodiment of the present invention, edges of the first permanent magnet and the second permanent magnet are in contact with each other but, for example, may be arranged so that end faces thereof are in contact with each other.

Also, in the second embodiment of the present invention, two permanent magnets form each magnetic pole, but the number of permanent magnets may be three or more.

In the second embodiment of the present invention, the permanent magnet is mainly made of rare earth materials but may instead be a bonded magnet.

In the second embodiment of the present invention, the cooling cycle used in the air conditioner has been described, but the cooling cycle may be used for a cooling device or a refrigeration device, etc.

Meanwhile, the present invention is not limited to the first and second embodiments, and may be variously modified within a range that can achieve the same object and effect as that of the present invention.

The invention claimed is:

1. An air conditioner using a compressor having a magnet-embedded motor, the air conditioner comprising:
a stator including a plurality of teeth formed, toward a central axis, at an inner circumferential part of a yoke in a cylindrical shape, and coils wound around the plurality of teeth; and
a rotor rotatably installed in the stator and including a plurality of magnetic poles, each of the magnetic poles being configured of two permanent magnets and formed in a circumferential direction at regular intervals,
wherein the rotor further includes:
outer flux barriers formed with air gaps and formed at each of radially outer ends of the two permanent magnets of each magnetic pole; and
inner flux barriers formed with air gaps and formed at each of radially inner ends of the two permanent magnets of each magnetic pole, wherein the inner flux barriers of each of the two permanent magnets are spatially connected to each other, and
when a distance between magnetic poles that are adjacent to each other is referred to as A and a width dimension of one tooth of the plurality of teeth is referred to as B, a relation of A=k×B (k is in a range of 1.65 to 1.75) is satisfied.

2. The air conditioner of claim 1, wherein each of the plurality of magnetic poles includes the two permanent magnets arranged in a V-shape convexly toward the central axis.

3. The air conditioner of claim 2, wherein an opening angle between the permanent magnets arranged in a V-shape is in a range of 100 to 120°, and while a vertex of the V-shape of the permanent magnets arranged in the V-shape is positioned on center lines of the teeth, front end faces of the teeth positioned closest to the radially outer end of the permanent magnets face respective inner parts of the permanent magnets arranged at an outer circumferential surface of the rotor in the V-shape.

4. The air conditioner of claim 1, wherein the rotor further includes a rotor iron core having a plurality of holes formed along an outer circumference thereof so that the two permanent magnets are inserted into the holes, wherein the two permanent magnets are arranged in a V-shape to gradually separate from each other toward a radially outer side from a rotation center of the rotor iron core.

5. The air conditioner of claim 4, further comprising a bridge section formed along an outer circumferential surface of the rotor iron core, wherein the bridge section is formed on a radially outer side further than the outer flux barrier.

6. The air conditioner of claim 5, wherein a magnetic flux density of the bridge section varies depending on a width dimension of the bridge section, and the magnetic flux density of the bridge section is set to be in a range of 1.8 to 1.9 T.

7. The air conditioner of claim 5, wherein the outer flux barrier includes:
a first space portion formed at an outside thereof in a planar direction of the corresponding permanent magnet from a radially outer end face of the permanent magnet; and
a second space portion formed at an outer side of the V-shape further than the permanent magnet so that a width dimension of the bridge section is uniform.

8. The air conditioner of claim 7, wherein a circumferential dimension of an outer end of the outer flux barrier is equal to or greater than five times the width dimension of the bridge section.

9. The air conditioner of claim 1, wherein the distance between the magnetic poles that are adjacent to each other is a width dimension of a magnetic flux path formed between outer flux barriers adjacent to each other in the magnetic poles that are adjacent to each other.

10. The air conditioner of claim 1, wherein 1.5 to 3 slots formed between the teeth are positioned to correspond to a separation between the magnetic poles that are adjacent to each other.

11. The air conditioner of claim 1, wherein the radially inner ends of the two permanent magnets forming the magnetic poles are attached to each other.

12. A magnet-embedded motor comprising:
a stator including a plurality of teeth formed, toward a central axis, at an inner circumferential part of a yoke in a cylindrical shape, and coils wound around the plurality of teeth; and
a rotor rotatably installed in the stator and including a plurality of magnetic poles, each of the magnetic poles being configured of two permanent magnets and formed in a circumferential direction at regular intervals,
wherein the rotor further includes:
outer flux barriers formed with air gaps and formed at each of radially outer end of the two permanent magnets of each magnetic pole; and
inner flux barriers formed with air gaps and formed at each of radially inner end of the two permanent magnets of each magnetic pole, wherein the inner flux barriers of each of the two permanent magnets are spatially connected to each other, and
when a distance between magnetic poles that are adjacent to each other is referred to as A and a width dimension of one tooth of the plurality of teeth is referred to as B, a relation of A=k×B (k is in a range of 1.65 to 1.75) is satisfied.

13. The magnet-embedded motor of claim 12, wherein each of the plurality of magnetic poles includes the two permanent magnets arranged in a V-shape convexly toward the central axis.

14. The magnet-embedded motor of claim 12, wherein the rotor further includes a rotor iron core having a plurality of holes formed along an outer circumference thereof so that the two permanent magnets are inserted into the holes, wherein the two permanent magnets are arranged in a V-shape to gradually separate from each other toward the radially outer side from a rotation center of the rotor iron core.

15. The magnet-embedded motor of claim 14, further comprising a bridge section formed along an outer circumferential surface of the rotor iron core, wherein the bridge section is formed on the radially outer side further than the outer flux barrier.

16. A magnet-embedded motor comprising:

a shaft configured to rotate about a central axis;

a stator including a plurality of teeth formed toward the central axis and coils wound around the plurality of teeth; and a rotor rotatably installed in the stator and including a plurality of magnetic poles, each of the magnetic poles being arranged in a V-shape convexly toward the central axis in a circumferential direction at regular intervals, wherein the rotor further includes:

a rotor iron core including a plurality of magnet insertion holes formed along an outer circumference thereof;

a plurality of permanent magnets inserted into the plurality of magnet insertion holes to form the plurality of magnetic poles;

outer flux barriers formed at each of radially outer ends of the plurality of permanent magnets; and inner flux barriers formed at each of radially inner ends of the plurality of permanent magnets, wherein the plurality of permanent magnets are arranged in a V-shape to gradually separate toward a radially outer side from a rotation center of the rotor iron core, and when a distance between magnetic poles that are adjacent to each other is referred to as A and a width dimension of one tooth of the plurality of teeth is referred to as B, a relation of A=k×B (k is in a range of 1.65 to 1.75) is satisfied.

17. The magnet-embedded motor of claim 16, wherein:

the inner flux barriers of the plurality of permanent magnets are spatially connected to each other; and the outer flux barriers of the plurality of permanent magnets are formed at radially inner sides further than the bridge section formed along an outer circumferential surface of the rotor iron core.

18. The magnet-embedded motor of claim 17, wherein the outer flux barrier includes:

a first space portion formed at an outer side thereof in a planar direction of the corresponding permanent magnet from the radially outer end face of the permanent magnet; and a second space portion formed at an outer side of the V-shape further than the permanent magnet so that a width dimension of the bridge section is uniform.

19. The magnet-embedded motor of claim 16, wherein an opening angle between the permanent magnets arranged in a V-shape is in a range of 100 to 120°, and while a vertex of the V-shape of the permanent magnets arranged in the V-shape is positioned on center lines of the teeth, front end faces of the teeth positioned closest to the radially outer ends of the permanent magnets face respective inner parts of the permanent magnets arranged at an outer circumferential surface of the rotor in the V-shape.

* * * * *